US008656458B2

(12) United States Patent
Heffez

(10) Patent No.: US 8,656,458 B2
(45) Date of Patent: *Feb. 18, 2014

(54) METHOD AND SYSTEM FOR AUTHENTICATING INTERNET USER IDENTITY

(76) Inventor: Guy Heffez, New York, NY (US)

( * ) Notice: Subject to any disclaimer, the term of this patent is extended or adjusted under 35 U.S.C. 154(b) by 885 days.

This patent is subject to a terminal disclaimer.

(21) Appl. No.: 12/357,380

(22) Filed: Jan. 21, 2009

(65) Prior Publication Data

US 2009/0222891 A1 Sep. 3, 2009

Related U.S. Application Data

(63) Continuation-in-part of application No. 11/405,789, filed on Apr. 18, 2006.

(60) Provisional application No. 60/711,346, filed on Aug. 25, 2005.

(51) Int. Cl.
H04L 29/06 (2006.01)

(52) U.S. Cl.
USPC .......... 726/2; 455/404.2; 455/414.2; 455/440

(58) Field of Classification Search
CPC ............... H04L 63/08; H04W 36/22
USPC ............................................. 726/2
See application file for complete search history.

(56) References Cited

U.S. PATENT DOCUMENTS

| 6,223,044 | B1 * | 4/2001 | Schultz .................. 455/456.1 |
| 6,370,629 | B1 * | 4/2002 | Hastings et al. .......... 711/163 |
| 6,466,779 | B1 | 10/2002 | Moles et al. |
| 7,376,431 | B2 | 5/2008 | Niedermeyer |
| 2001/0034718 | A1 | 10/2001 | Shaked et al. |
| 2002/0016831 | A1 | 2/2002 | Peled et al. |
| 2002/0188712 | A1 | 12/2002 | Caslin et al. |
| 2003/0056096 | A1 | 3/2003 | Albert et al. |
| 2003/0101134 | A1 | 5/2003 | Liu et al. |
| 2003/0187800 | A1 | 10/2003 | Moore et al. |
| 2004/0111640 | A1 | 6/2004 | Baum |
| 2004/0219904 | A1 * | 11/2004 | De Petris ................. 455/410 |
| 2005/0159173 | A1 | 7/2005 | Dowling |
| 2005/0160280 | A1 | 7/2005 | Caslin et al. |
| 2005/0180395 | A1 | 8/2005 | Moore et al. |
| 2006/0106930 | A1 * | 5/2006 | Shaffer .................... 709/224 |
| 2006/0107307 | A1 * | 5/2006 | Knox et al. ................. 726/2 |

FOREIGN PATENT DOCUMENTS

WO WO2004079499 A2 9/2004
WO WO 2004079499 A2 * 9/2004

* cited by examiner

Primary Examiner — Mohammad L Rahman
(74) Attorney, Agent, or Firm — James P. Demers; Gotham Patent Services LLC

(57) ABSTRACT

A method and system for authenticating an internet user identity by cross-referencing and comparing at least two independent sources of information. A first IP address of an internet user is identified and the geographical location of the first IP address is traced to determine a first location. The geographical-location of a communication voice device of said internet user is identified to determine a second location. The first and second locations are compared for geographical proximity to confirm the identity of the internet user. Based upon geographical proximity of said locations, a score is assigned to the internet user, and access to a website is allowed or limited based upon said score. Alternatively, additional authentication information can be required or access can be terminated. Geographical information is maintained in an updatable cache.

6 Claims, 2 Drawing Sheets

METHOD AND SYSTEM FOR AUTHENTICATING INTERNET USER IDENTITY

CROSS-REFERENCE TO RELATED APPLICATIONS

This application is a continuation-in-part of U.S. utility patent application Ser. No. 11/405,789 filed Apr. 18, 2006 to the same inventor, which, in turn, claims the benefit of provisional application No. 60/711,346 filed on Aug. 25, 2005. This patent also incorporates herein by reference the entire disclosure of U.S. utility patent application Ser. No. 11/346,240 filed Feb. 3, 2006 with one common inventor.

BACKGROUND OF THE INVENTION

The invention relates to a method and system for authenticating internet user identity, and more particularly, to a method and system for authenticating internet user identity by cross-referencing the geographical location of a internet user's Communication voice device, such as a mobile voice device, a Voice over Internet Protocol (hereinafter VoIP) telephone or non-mobile telephone, and the location of a client Internet Protocol (hereinafter IP address).

The use of the internet has become a common a popular arena for the sale of goods and services. Such sales require the transmission of personal and confidential data belonging to the buyer of such goods and services. Such information is often the target of identity theft. In response to the increase in the opportunity for the commission of fraud through identity theft, sellers and providers of goods and services through the internet require a method whereby such fraud can be reduced.

With respect to internet usage, upon accessing the internet, an internet user's computer is identified with an IP address, it should be understood that IP Address means any internet communication protocol such as but not limited to IPV4 and IPV6. And whenever the internet user enters a website, the internet user's IP address is identified to the website owner. Such identified IP addresses can be traceable geographically to its source so as to determine the location (state and city) of the internet user, in some cases the IP address can be traced to a radius of a few miles from its source. The comparison of the geographical location of the internet user IP address, with the geographical location of said internet user Communication voice device can provide the seller or provider a means to authenticate the identify of the internet user.

U.S. patent application Pub. No. 2001/0034718 A1 to Shaked et al. discloses a method of controlling access to a service over a network, including the steps of automatically identifying a service user and acquiring user information, thereby to control access. Additionally, a method of providing service over a network, in which the service requires identification of a user, including the steps of automatically identifying the user and associating the user with user information, thus enabling the service, is disclosed.

U.S. Pat. No. 6,466,779 to Moles et al. discloses a security apparatus for use in a wireless network including base stations communicating with mobile stations for preventing unprovisioned mobile stations from accessing an internet protocol (IP) data network via the wireless network.

U.S. patent application Pub. No. 2002/0188712 A1 to Caslin et al. discloses a fraud monitoring system for a communications system. The fraud monitoring system analyzes records of usage activity in the system and applies fraud pattern detection algorithms to detect patterns indicative of fraud. The fraud monitoring system accommodates both transaction records resulting from control of a packet-switched network and those from a circuit-switched network gateway.

U.S. patent application Pub. No. 2003/0056096 A1 to Albert et al. discloses a method to securely authenticate user credentials. The method includes encrypting a user credential with a public key at an access device. The public key is part of a public/private key pair suitable for use with encryption algorithm. The decrypted user credential is then transmitted from the decryption server to an authentication server for verification. The decryption server typically forms part of a multi-party service access environment including a plurality of access providers. This method can be used in legacy protocols, such as Point-to-Point Protocol (PPP), Password Authentication Protocol (PAP), Challenge-Handshake Authentication Protocol (CHAP), Remote Authentication Dial in User Server (RADIUS) protocol, Terminal Access Controller Access Control System (TACAS) protocol, Lightweight Directory Access Protocol (LDAP), NT Domain authentication protocol, Unix password authentication protocol, Hypertext Transfer Protocol (HTTP), Hypertext Transfer Protocol over Secure sockets layer (HTTPS), Extended Authentication Protocol (EAP), Transport Layer Security (TLS) protocol, Token Ring protocol, and/or Secure Remote Password protocol (SRP).

U.S. patent application Publication Number US 2003/0101134 A1 published to Liu et al. on May 29, 2003 teaches a method for transaction approval, including submitting a transaction approval request from a transaction site to a clearing agency; submitting a user authorization request from the clearing agency to a user device; receiving a response to the user authorization request; and sending a response to the transaction approval request from the clearing agency to the transaction site. Another method for transaction approval includes: submitting a transaction approval request from a transaction site to a clearing agency; determining whether a trusted transaction is elected; submitting a user authorization request from the clearing agency to a user device if a trusted transaction is determined to be elected; receiving a response to the user authorization request from the user device if the user authentication request was submitted; and sending a response to the transaction approval request from the clearing agency to the transaction site. A system for transaction approval includes a clearing agency for the transaction approval wherein the clearing agency having a function to request for user authorization, a network operatively coupled to the clearing agency, and a user device adapted to be operatively coupled to the network for trusted transaction approval.

U.S. patent application Publication Number US 2003/0187800 A1 published to Moore et al. on Oct. 2, 2003 teaches systems, methods, and program products for determining billable usage of a communications system wherein services are provided via instant communications. In some embodiments, there is provided for authorizing the fulfillment of service requests based upon information pertaining to a billable account.

U.S. patent application Publication Number US 2004/0111640 A1 published to Baum on Jun. 10, 2004 teaches methods and apparatus for determining, in a reliable manner, a port, physical location, and/or device identifier, such as a MAC address, associated with a device using an IP address and for using such information, e.g., to support one or more security applications. Supported security applications include restricting access to services based on the location of a device seeking access to a service, determining the location of stolen devices, and authenticating the location of the source of a message or other IP signal, e.g., to determine if a prisoner is contacting a monitoring service from a predetermined location.

U.S. patent application Publication Number US 2005/0159173 A1 published to Dowling on Jul. 21, 2005 teaches methods, apparatus, and business techniques for use in mobile network communication systems. A mobile unit, such as a smart phone, is preferably equipped with a wireless local area network connection and a wireless wide area network connection. The local area network connection is used to establish a position-dependent, e-commerce network connection with a wireless peripheral supplied by a vendor. The mobile unit is then temporarily augmented with the added peripheral services supplied by the negotiated wireless peripheral. Systems and methods allow the mobile unit to communicate securely with a remote server, even when the negotiated wireless peripheral is not fully trusted. Also included are mobile units, wireless user peripherals, and negotiated wireless peripherals projecting a non-area constrained user interface image on a display surface.

U.S. patent application Publication Number US 2005/0160280 A1 published to Caslin et al. on Jul. 21, 2005 teaches providing fraud detection in support of data communication services. A usage pattern associated with a particular account for remote access to a data network is monitored. The usage pattern is compared with a reference pattern specified for the account. A fraud alert is selectively generated based on the comparison.

U.S. patent application Publication Number US 2005/0180395 A1 published to Moore et al. on Aug. 18, 2005 teaches an approach for supporting a plurality of communication modes through universal identification. A core identifier is generated for uniquely identifying a user among a plurality of users within the communication system. One or more specific identifiers are derived based upon the core identifier. The specific identifiers serve as addressing information to the respective communication modes. The specific identifiers and the core identifier are designated as a suite of identifiers allocated to the user.

U.S. Pat. No. 7,376,431 B2 issued to Niedermeyer on May 20, 2008 teaches a system for geographic comparison using a position sensor on the person and a separate position sensor at the point of sale.

US patent application Publication Number US 2002/0016831 A1 by Peled, et al., published Feb. 7, 2002 teaches a collocation method that does not include mobile communication devices.

International application WO2004079499 published Sep. 16, 2004 to Eden teaches a collocation authentication system.

While these systems may be suitable for the particular purpose employed, or for general use, they would not be as suitable for the purposes of the present invention as disclosed hereafter.

SUMMARY OF THE INVENTION

It is an object of the invention to produce a means to decrease the potential for fraud through authentication of the identity of an internet user. Accordingly, this method provides for authenticating the identity of the internet user or purchaser (hereinafter "internet user") through cross-referencing and comparison of at least two independent sources of information, such as, but not limited to, the IP address of the internet user's computer, geographical location of the internet user, router geographical location or the geographical location of number of a Communication voice device associated with said internet user.

It is another object of the invention to provide a means for providing an accurate geographical location of the internet user and the internet user's IP address. Accordingly, this method includes identifying the IP address and tracing it geographically using any one of the existing software programs that can trace IP addresses.

It is another object of the invention to provide a convenient means for determining the location of internet users at both mobile and non-mobile Communication voice devices and terminals. Accordingly, this method includes the utilization systems and software that are used to locate the geographical location of people or Communication voice devices, such as, but not limited to Global Positioning Systems (GPS), Galileo, WiMax, WiFi, RFID and external positioning apparatus, such as, but not limited to, cellular base stations and antennas.

It is another object of the invention to provide a convenient means for determining a more accurate geographical location of routers using the internet user Communication voice device's geographical location and the said user IP address.

This invention is a method and system for authenticating an internet user identity by cross-referencing and comparing at least two independent sources of information. A first IP address of an internet user is identified. The geographical location of the IP address is traced geographically to determine a first location. The geographical address of a communications device of said internet user is traced to determine a second location. The first and second locations are compared for geographical proximity to confirm the identity of the internet user.

Additionally, depending on the geographical proximity of the first and second location, a positive or negative score may be assigned to the internet user, and access to the website and the ability to conduct transactions may be allowed or limited based on the assigned score. Alternatively, additional authentication information may be required of the internet user in order to proceed with the online transaction, or access by the internet user may be terminated.

Geographical information, such as a mobile communication device user's current location, is preferably cached in an updatable cache. The cache is checked for staleness before use and is updated during the transaction if the cached data is stale. Staleness may be determined based on a predetermined time period with or without additional criteria, such as evidence of spoofing or other security compromise.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

Figure 1:
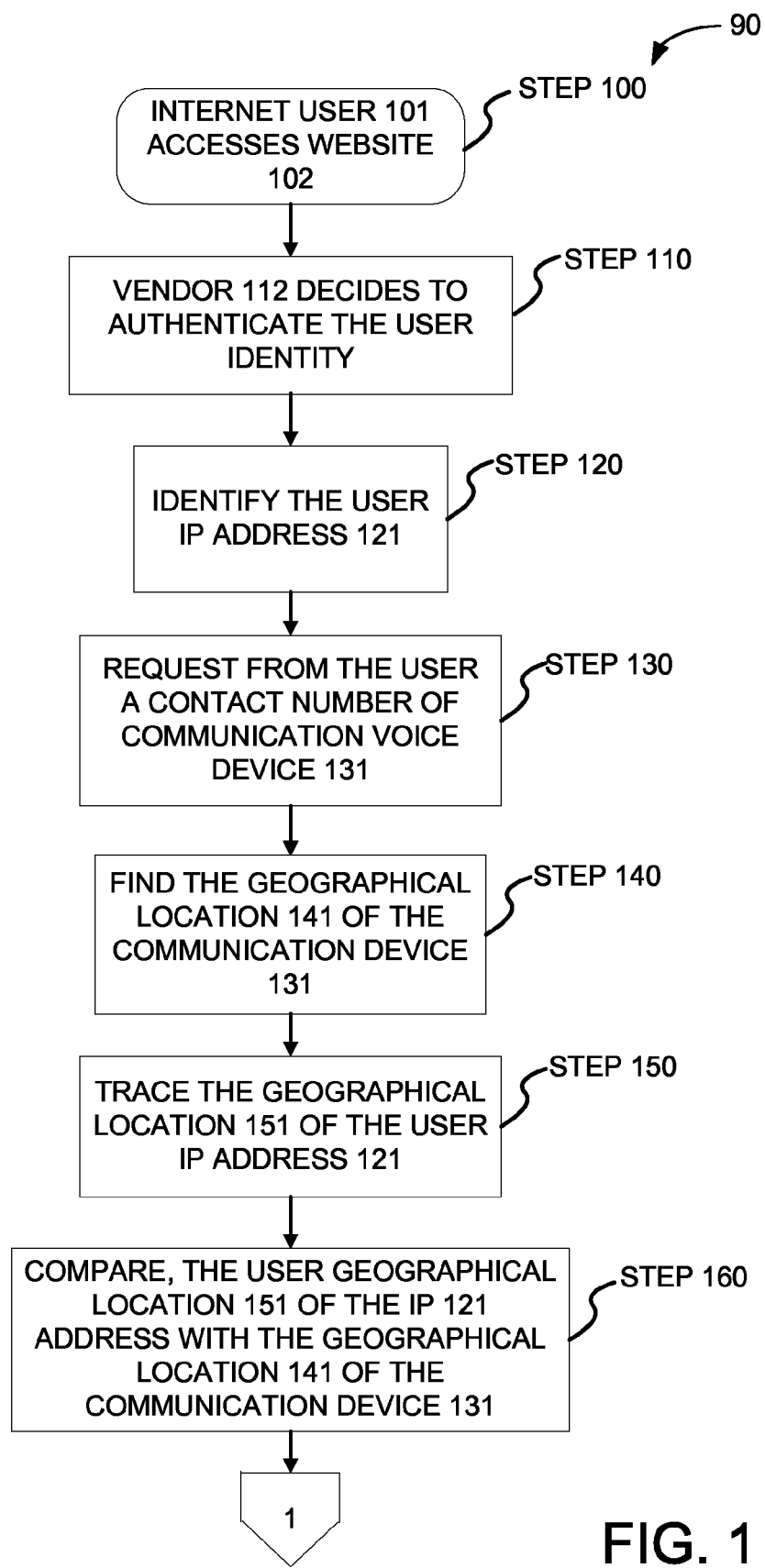
FIG. 1 is a flow chart of the method and system of the present invention.

See also the figures in U.S. utility patent application Ser. No. 11/346,240, incorporated by reference above.

DETAILED DESCRIPTION OF THE PREFERRED EMBODIMENTS

This invention relates to a method and system for authenticating internet user identity by cross-referencing or comparing at least two independent sources of information, identifying at least two geographical locations. Based upon geographical proximity of said locations, a score is assigned to the internet user, and predetermined access to a website and an ability to conduct transactions is allowed or limited based upon said score. Alternatively, additional authentication information can be required or access can be terminated. The invention is also a convenient means for determining a more accurate geographical location of routers.

This invention relates to a method and system for monitoring electronic transactions. In general terms, in one aspect of the invention a user identity (such as the user's credit card, cash card, etc.) is associated with a first wireless terminal, e.g., the user's cell phone. The position of the user's cell phone is determined at intervals and cached (i.e., archived) to provide a stream of regularly updated pre-transaction positions. Each cached pre-transaction position can be stored on a remote position database (PDB) or on the user's cell phone. If the user's identity such as the user's credit or cash card is later used, for example, at a point of sale (POS) electronic terminal having a known location (being a first location), the invention detects the use of the user's credit card (i.e., identity) at the first location and compares the first location with the most recent cached position of the user's cell phone (now treated as a pre-transaction position to provide a second location for comparison). Specifically, a determination is made as to whether the first and second locations match in geographical proximity. If the first and second locations do not match in geographical proximity, the invention generates an alert or advisory message that is communicated to a predetermined notification device, such as the user's email account, a POS electronic terminal, a financial institution's computers or offices (such as the user's credit card company's computers, etc.). The alert can also be a reply message for blocking an associated electronic transaction at the first location.

The invention can be adjusted such that as each new pre-transaction position corresponding to the user's cell phone becomes available, the new pre-transaction position can be used to overwrite the currently archived pre-transaction position to prevent illicit or unauthorized tracking of the user's movements.

In another aspect of the invention, if the latest archived pre-transaction location (i.e., second location) and known POS location (i.e., first location) don't match, a post-transaction position (being a third location) of the user's cell phone is obtained and compared to the known first location and an alert generated if the post-transaction location (third location) and known POS location (first location) do not match in geographical proximity. Such matching can be based on a predetermined distance. For example, if the post-transaction location of the user's cell phone is determined to be more than 5 miles from the known POS location, an alert is generated and communicated to a predetermined device such as the user's cell phone and/or email address, and/or to an appropriate financial institution such as the user's bank or a credit card company's computers, the user's wireless personal digital assistant or a user's wireless enabled laptop, etc. Thus, if the actual position of the user's cell phone is not available at about the time of the transaction, the pre or post-transaction position of the user's cell phone can be used to determine if an alert is warranted.

For example, the user's cell phone may include a GPS receiver capable of determining the position of the user's cell phone, but only if the user's GPS capable cell phone is able to receive GPS signals necessary to calculate the location of the user's cell phone. GPS signals are transmitted by dedicated satellites and are often not strong enough to be received inside buildings where many ATM and POS terminals are located. The invention provides a non-obvious way of monitoring the use of one or more identities (such as a credit card or cash card number) associated with a user regardless of the ability of a user's cell phone to pick up GPS signals at the time of transaction (i.e., when the user's identity is used to authorize a transaction).

Specifically, through such monitoring, the invention facilitates the detection of a possible fraudulent or an invalid electronic purchase involving the use of a user's identity, for example, a credit card, debit card or any other kind of electronic payment or purchase system including biometric based purchases. Upon detection of suspect purchase or transaction (such as a cash withdrawal at an ATM), an advisory message is communicated to a predetermined notification device. The intent of this invention is to provide an alert upon detection of an inappropriate purchase or transaction.

In an embodiment of the invention, a user's IP address is identified and a wireless communication voice device of the user is located, enabling the business to assign the location of the wireless communication voice device to the IP address, preferably in a database.

In another embodiment of the invention, a router IP address associated with a user's IP address is identified and a wireless communication voice device of the user is located, enabling the business to assign the location of the wireless communication voice device to the router IP address, preferably in a database.

In yet another embodiment of the invention, the mailing address of an internet user is identified and a communication voice device of the user is located, enabling the business to compare the mailing address and the location of the communication voice device.

In still yet another embodiment of the invention, the mailing address and IP address of an internet user are identified and a communication voice device of the user is located, enabling the business to assign the mailing address to the IP address. Location of the user's communication voice device may be used to validate the association.

In still yet another embodiment of the invention, the internet user IP address is located using the communication voice device and the mailing address, where either of the communication voice device location and the mailing address is used to cross-check the other.

In still yet another embodiment of the invention, the internet user IP address is compared with the internet user's communication voice device, the internet user's mailing address, a WiMax unique ID, or a WiFi unique ID.

In still yet another embodiment of the invention, the internet user IP address is located by assigning to it the location associated with the internet user's communication voice device, the internet user's mailing address, a WiMax unique ID, or a WiFi unique ID.

Figure 2:
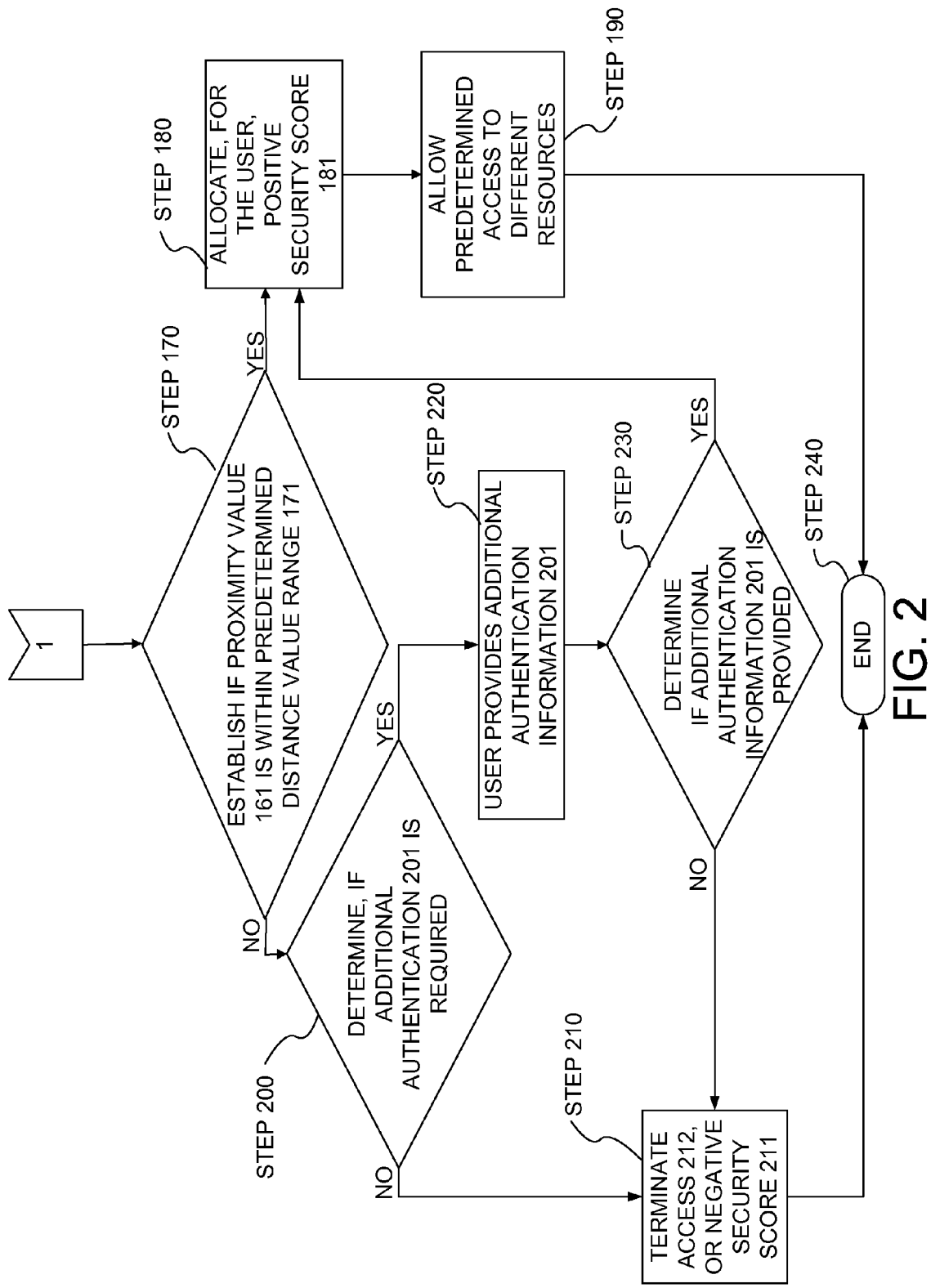
FIG. 2 is a continuation of the flow chart of the present invention.

FIG. 1 illustrates a method for authenticating internet user identity by cross-referencing and comparing at least two independent sources of information. FIG. 2 illustrates a method for allocating a score to an internet user based on the comparison of information in the steps of FIG.

In still another aspect of the first embodiment, the step of determining the second location further comprises the step of detecting a WiFi Unique ID associated with the position of the first wireless terminal, and converting the WiFi unique ID into a post-transaction location for the first wireless terminal, the post-transaction location being the second location, wherein the step of detecting a WiFi Unique ID is only performed if cached position information is not stored on the first wireless terminal. For example, if the wireless terminal lacks cached position information and the first wireless terminal is able to detect a WiFi unique ID, then the WiFi unique ID is used to determine the position of the first wireless terminal. This might entail accessing a database that matches a WiFi's unique ID (i.e., identity such as, but not limited to, an Internet media-access-control (MAC) address) with known positions corresponding to each WiFi unique ID. This database might be stored, for example, on a <1.5" hard drive (i.e., a less-than or equal to 1.5 inch hard drive) or on a large capacity memory chip fitted to the first wireless terminal 160.

In still another aspect of the first embodiment, the step of determining the second location further comprises the step of detecting a WiMAX Unique ID associated with the position of the first terminal, and converting the WiMAX Unique ID into a post-transaction location for the first wireless terminal, the post-transaction location being the second location, wherein the step of detecting a WiMAX Unique ID is only performed if cached position information is not stored on the first wireless terminal. Alternatively, the step of detecting a WiMAX Unique ID is only performed if the cached position information is stale, wherein the cached position information is regarded as stale if the information has not been updated for a predetermined time period.

Referring to FIG. 1, the method 90 starts by when an internet user 101 accesses 100 a website 102 and provides information. The website 102 vendor 112 then decides to authenticate 110 internet user 101 identity, based on the information provided by the internet user 101. What information will trigger the decision to authenticate 110 the identity 113 of the internet user 101 will vary among vendors employing the method described herein. For purposes of clarity, the term vendor will be used hereafter and it should be understood that vendor means any business, organization or commercial entity which conducts on-line commercial transactions through a website on the internet, such as, but not limited to, banking institutions, on-line stores or other commercial entities.

Upon accessing a website 102, an IP address 121 of a computer of the internet user 101 will be identified 120. The invention is not limited to a convention computer, but may include terminals, smart phones (PDA's) or other devices capable of communicating with the internet. Whenever the internet user 101 enters a website 102, the internet user's IP address 121 is identified for a website owner. It should be understood that IP Address means any internet communication protocol such as but not limited to IPV4 and IPV6.

The vendor 112 will then request 130 from the internet user 101 a contact number for a communications voice device 131, which is immediately accessible to the internet user 101 at the internet user's current location. Communication voice device, as used in the context of the present invention, applies to any voice device capable of communicating with another voice device such as, but not limited to, phone, mobile voice device, VoIP telephone or personal digital assistant (hereinafter PDA). Other non-limiting examples include any device that has been modified or designed for voice or text communication.

A geographical location 141 for the communication voice device 131 is then traced 140.

It should be understood that the term "mobile voice device", as used in the context of the present invention, applies to any mobile device modified or designed for voice or text communication and capable of communicating with another device via wireless network such as but not limited to cellular system, radio system, WiFi, WiMax, RFID, Bluetooth, MIMO, UWB (Ultra Wide Band), satellite system or any other such wireless networks known now or in the future.

Other non-limiting examples include any device that has been modified or designed to communicate with a web-ready PDA, a BLACKBERRY™ wireless communication device, a laptop computer with cellular connect capability, or a notification server, such as email server.

The geographical location 141 of a telephone can be traced using any one of existing databases. As a non-mobile telephone is attached to a single physical location, the location is available using various existing databases. A Voice over Internet Protocol (hereinafter VoIP) telephone is connected to high speed internet access such as T1, DSL, cable modems, or other available connection systems. A VoIP location is available using various databases. A VoIP connection provider company can provide the IP address to which such VoIP telephone is connected such that the geographical location of the internet user is traceable to the IP address.

The geographical location 141 of a mobile voice device can be traced using technology such as, but not limited to, Galileo, GPS, cellular antenna network, phone antenna, WiFi, Bluetooth, MIMO, UWB, WiMax, etc.

A cellular telephone location system for automatically recording the location of one or more mobile cellular telephones is described, for example, in U.S. Pat. No. 5,327,144. The system comprises a central site system operatively coupled to at least three cell sites. Each of the cell sites receives cellular telephone signals and integrates a timing signal common to all the cell sites.

The central site calculates differences in times of arrival of the cellular telephone signals arriving among the cell sites and thereby calculates the position of the cellular telephone producing the cellular telephone signals. Additional examples of known methods for locating phones are cell sector and cell site.

The position of an internet user's mobile voice device can be determined by, for example: (1) an internal positioning apparatus such as a Global Positioning System (hereinafter GPS) receiver built into the mobile voice device that receives GPS radio signals transmitted from GPS satellites; and (2) an external positioning apparatus such as a cellular positioning system that computes the position of the mobile voice device by observing time differences among the arrivals of a radio signal transmitted by the mobile voice device at a plurality of observation points, i.e., base stations. The operation of the GPS is well-known and will not be described further herein.

Next, the geographical location 151 of the IP address 121 of the internet user 101 is traced 150. Such an IP address 121 can be traced 150 geographically to its source so as to determine the location 151 (state and city) of the internet user 101. In some cases the system used to trace the IP address 121 can be so accurate that it can identify a street and house number of the internet user 101.

Several non-limiting examples for geographically tracing 140 an IP address 121 are "tracert 212.96.20.101" when using Windows, "traceroute 212.96.20.101" when using Linux. "Neotrace" www.neotrace.com, or www.ip2location.com, which shows the internet user 101 IP address 121 and a location 151 (city and state) of the internet user 101.

Another means for obtaining the geographical location 151 of the internet user's 101 IP address 121, the internet user's 101 ISP can be contacted to request a full address from where the internet user 101 is connected. For example, a modem dial-up internet user 101 is assigned a unique IP address 121 by their ISP. After the internet user 101 enters a username and password the ISP knows from which phone number that internet user 101 called and can trace a contacting number to a geographical location 151.

The geographical location 141 of the communications voice device 131 is then compared 160 with the geographical location 151 of the IP address 121 of the internet user 101, and a proximity value 161 is determined.

Referring to FIG. 2, following the comparison 160 of the geographical location 151 of the IP address 121 and the geographical location 141 of communications voice device 131 of the internet user 101, and the obtaining of the proximity value 161, establish 170 if the proximity value 161 is within a predetermined distance value range 171. The predetermined distance value range 171 and a corresponding positive or negative score values are established by the website 102 vendor 112. If the value 161 is within the predetermined range 171, allocate 180 a positive security score 181 and allow predetermined access 190 to the website and allow the internet user 101 to conduct high risk actions such as, but not limited to, transferring money, sending check, purchasing a product or a service or transmitting personal information.

Following the comparison 150, if the value 161 is outside the predetermined distance value range 171, determine 200 if additional authentication information 201 is required. What additional authentication information 201 that will be required is to be determined by the website 102 vendor 112. If additional authentication information 201 is required, the internet user 101 provides 220 the required authentication information 201. After determining 230 that the required additional authentication information 201 has been correctly provided, allocate 180 a positive security score 181, and allow predetermined access 190 to the website. If it is determined 230 that the required additional authentication information 201 has not been provided, a negative security score 211 is allocated 210 or access is terminated 212.

The present invention includes a method of locating a router's geographical location based on internet user communication voice device's geographical location and internet user IP address. In addition, the invention includes a method of geographically comparing the user communication voice device and the closet public router to the user IP address. Furthermore, the invention includes a method of comparing the geographical location of a router with the geographical location of the communication voice device of an internet user. Lastly, the invention includes a method of geographically comparing the internet user communication voice device and the internet user IP address. All of the methods may utilize a communication voice device that is either non-mobile telephone, a mobile telephone or a mobile voice device.

For locating more accurate geographical location of the routers the Vendor can perform trace-route or similar network analysis commands to the known internet user IP address. The trace-route commands (such as "traceroute" in Unix, Linux and OS-x, and 'tracert' or 'pathping' in Windows operating systems) is used in a wide variety of computer operating systems and network appliances. A trace-route command causes packets to be sent out with short lifetimes in order to map the IP addressable route to another machine. Each packet is given a slightly different lifetime. When a router expires the packet, it sends back a notification that includes its IP address. This allows a machine to identify the addresses of all the routers between the vendor and the internet user computer on the Internet.

Since the following is known: 1) the geographical location of the user's communication voice device and 2) the routing table between the vendor internet web site and the internet user. Then, the vendor can locate the geographical location of the closest public router to the internet user IP address, since the first public router that the internet user is using is close geographically to the internet user voice communication device.

The invention also includes a method of geographically comparing an internet user physical address and an internet user IP address. As well as a method of comparing a geographical location of a router with a geographical location of an internet user physical address, and a method of locating a router's geographical location based on an internet user physical address geographical location and internet user IP address geographical location. The term physical address is construed to mean mailing address or mailing zip code.

It is to be understood that the present invention is not limited to the embodiments described above, but encompasses any and all embodiments under the doctrine of equivalents.

In conclusion, herein is presented a method and system for authenticating internet user identity. The invention is illustrated by example in the drawing figures, and throughout the written description. It should be understood that numerous variations are possible, while adhering to the inventive concept. Such variations are contemplated as being a part of the present invention.

I claim:

1. A computer-implemented method of authenticating an Internet user identity, comprising implementing on a computer the following steps:
   a. identifying an Internet Protocol address of a router used by an Internet user to connect a wireless communication voice device to a web site, wherein the router is a first router between the wireless communication voice device and the web site;
   b. obtaining a first geographical location of the wireless communication voice device, and assigning to the Internet Protocol address of the router, in a database, a geographical location based on at least the first geographical location of the wireless communication voice device;
   c. obtaining a second geographical location of the wireless communication voice device based on a source independent from the source used in step (b);
   d. determining whether the second location and the location assigned to the Internet Protocol address of the router match in geographical proximity;
   e. if the location assigned to the Internet Protocol address of the router and the second location do not match in geographical proximity, obtaining a third geographical location of the wireless communication voice device;
   f. determining whether the location assigned to the Internet Protocol address of the router and the third location match in geographical proximity; and
   g. authenticating the Internet user identity if a match in geographical proximity is found in step (d) or step (f);
   wherein at least one of said mobile voice device geographical locations is determined by identifying a WiFi MAC Address having a known position.

2. A computer-implemented method of authenticating an Internet user identity, comprising implementing on a computer the following steps:
   a. identifying an Internet Protocol address of a router used by an Internet user to connect a wireless communication voice device to a web site;
   b. obtaining a first geographical location of the wireless communication voice device, and assigning to the Internet Protocol address of the router, in a database, a geographical location based on at least the first geographical location of the wireless communication voice device;

c. obtaining a second geographical location of the wireless communication voice device based on a source independent from the source used in step (b);
d. determining whether the second location and the location assigned to the Internet Protocol address of the router match in geographical proximity;
e. if the location assigned to the Internet Protocol address of the router and the second location do not match in geographical proximity, obtaining a third geographical location of the wireless communication voice device;
f. determining whether the first location assigned to the Internet Protocol address of the router and the third location match in geographical proximity; and
g. authenticating the Internet user identity if a match in geographical proximity is found in step (d) or step (f);

wherein at least one of said mobile voice device geographical locations is determined by identifying a WiFi MAC Address having a known position.

3. The computer-implemented method of authenticating an Internet user identity according to claim 1, further comprising cross-referencing and comparing at least one of said locations with an independent source of information selected from:
 a. a physical geographical location of the Internet user; and
 b. a geographical location of a wireless terminal associated with such the Internet user.

4. The computer-implemented method of authenticating an Internet user identity according to claim 2, further comprising cross-referencing and comparing at least one of said locations with an independent source of information selected from:
 a. a physical geographical location of the Internet user; and
 b. a geographical location of a wireless terminal associated with the Internet user.

5. The method of claim 1, wherein said step of determining said location of the wireless communication voice device comprises use of at least one of the following systems:
 a) Global Positioning System (GPS);
 b) Galileo
 c) WiMax
 d) WiFi;
 e) Bluetooth;
 MIMO;
 g) UWB;
 h) RFID; and
 i) Cellular triangulation.

6. The method of claim 2, wherein said step of determining said location of the wireless communication voice device comprises use of at least one of the following systems:
 a) Global Positioning System (GPS);
 b) Galileo
 c) WiMax
 d) WiFi;
 e) Bluetooth;
 f) MIMO;
 g) UWB;
 h) RFID; and
 i) Cellular triangulation.

* * * * *